(No Model.)
J. W. IVORY.
DENTAL MATRIX RETAINER.
No. 606,460. Patented June 28, 1898.
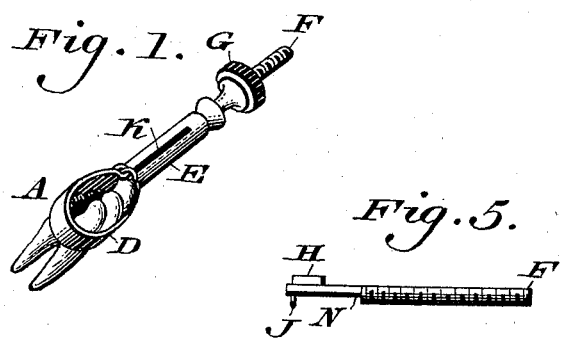
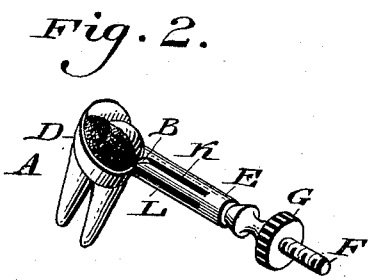
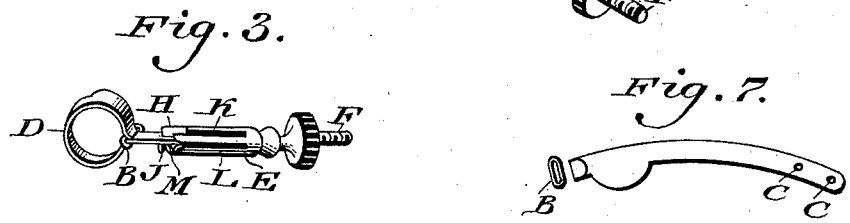
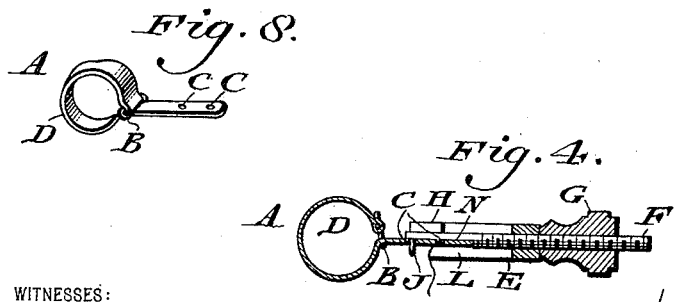
WITNESSES:
INVENTOR
James W. Ivory
BY
ATTORNEYS.

UNITED STATES PATENT OFFICE.

JAMES W. IVORY, OF PHILADELPHIA, PENNSYLVANIA.

DENTAL MATRIX-RETAINER.

SPECIFICATION forming part of Letters Patent No. 606,460, dated June 28, 1898.

Application filed November 20, 1897. Serial No. 659,286. (No model.)

*To all whom it may concern:*

Be it known that I, JAMES W. IVORY, a subject of the Queen of Great Britain, residing in the city and county of Philadelphia, State of Pennsylvania, have invented a new and useful Improvement in Dental Matrix-Retainers, which improvement is fully set forth in the following specification and accompanying drawings.

My invention consists of a dental matrix-retainer formed of a follower, a barrel or sleeve containing the same, a hook on the follower for connecting it with the matrix-band, a screw on the follower, a nut on said screw whereby said band may be tightened and loosened, and a lip on said follower freely entering a recess or slot in the barrel for preventing rotation of the matrix during the operation of the follower.

It also consists in providing the barrel with a serrated end, whereby when the barrel is seated on a tooth it is prevented from slipping.

Figures 1 and 2 represent perspective views of a matrix-retainer embodying my invention, the same being shown in operative position. Fig. 3 represents a perspective view thereof as removed from said position. Fig. 4 represents a longitudinal section thereof. Fig. 5 represents a side elevation of the follower of the device. Fig. 6 represents a perspective view of the barrel of the retainer. Fig. 7 represents a side elevation of the band of the device in opened-out condition. Fig. 8 represents a perspective view of said band in operative condition.

Similar letters of reference indicate corresponding parts in the figures.

Referring to the drawings, A designates a band adapted for forming a dental matrix, the same having a link or loop B at one end and openings C C on the other end, the latter being passed through said link, forming the ring D, which is adapted to encircle the tooth which is to be subjected to the dental operation. In order to tightly retain the ring in position, I employ the barrel or sleeve E, within which is the follower F, which is screw-threaded for the engagement of a nut G, whereby said follower may be operated, the forward portion of the follower being provided with the lip H and hook J, the sleeve being formed with longitudinally-extending slots K and L, which are adapted to receive said lip and hook, respectively, during the sliding motions of the follower, said lip preventing rotary motion of the latter. The hook J is adapted to enter either of the openings C of the band A for connecting the follower with said band.

The end of the barrel is formed or provided with serrations M, in order to cause the same to take firm hold on the tooth and be prevented from slipping, it being noticed on inspection of Figs. 3 and 8 that the portion of the band about the loop B is made narrow or reduced, so as to be less than the diameter of the serrated end of the barrel, whereby portion of said end may contact with the tooth.

The operation is as follows: The band is passed through the loop B and a portion of the same converted into the ring D, which is adapted to encircle the tooth which is to be subjected to the dental operation. The hook J is inserted in one of the openings C and the matrix applied to the tooth. The nut G is properly rotated, and as the end of the barrel has a bearing on the tooth and the ring encircles said tooth the attaching end of the band is drawn into the barrel, thus contracting the ring and tightening it on the tooth, when the operation may be performed, as will be apparent on inspection of Figs. 1 and 2 of the drawings, it being also apparent that the barrel retains its position on the tooth, so that displacement of the matrix is prevented.

The portion of the follower F against which the end of the band A contacts is cut away, forming the recess M, in which said end may rest, so as to be approximately flush with the remainder of the follower.

Having thus described my invention, what I claim as new, and desire to secure by Letters Patent, is—

1. A matrix consisting of a band having a loop at one end and the other end passing through said loop, a barrel having a longitudinal slot therein, a follower mounted in said barrel and adapted to be connected with the free end of said band, a lip on said follower adapted to register with said slot, and a nut engaging with said follower and bearing on said barrel.

2. The combination with a matrix consisting of a band having a loop at one end and the other end passing through said loop, of a barrel having a serrated bearing end, a follower mounted in said barrel and engaging with the free end of said band, and means for moving said follower in said barrel.

3. A follower provided with a lip and means for connection with a matrix, a barrel which is adapted to receive said follower, and having a slot in which said lip is adapted to have longitudinal play, and means for operating said follower, said barrel having a recess in its side, the same being adapted to have the end of the matrix-band seated therein.

4. In a dental matrix-retainer, a barrel containing a follower which may be connected with and control a matrix, and serrations on the end of said barrel for engagement with a tooth.

JAMES W. IVORY.

Witnesses:
 JOHN A. WIEDERSHEIM,
 WM. C. WIEDERSHEIM.